J. SHEPHERD.
ANIMAL TRAP.
APPLICATION FILED FEB. 19, 1906.
902,005.
Patented Oct. 27, 1908.
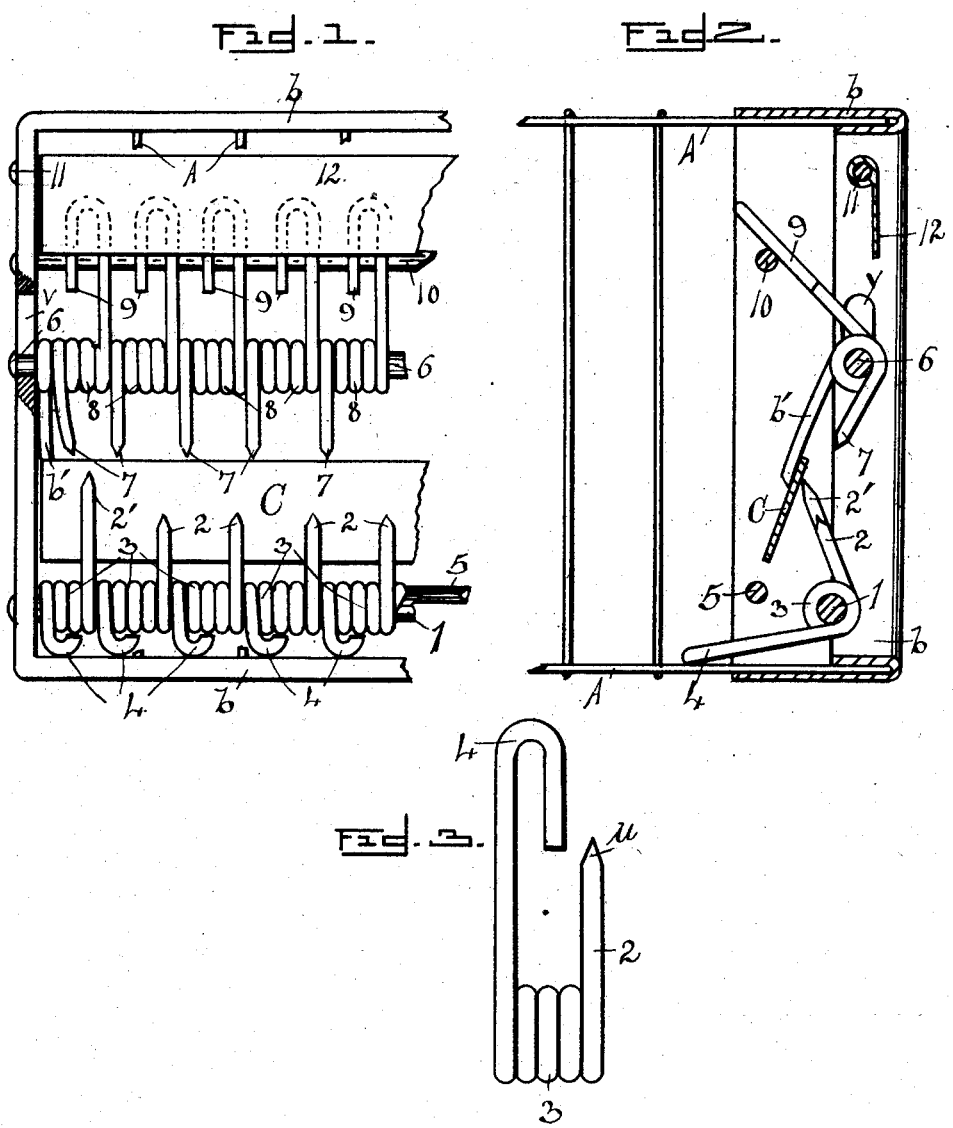

UNITED STATES PATENT OFFICE.

JOHN SHEPHERD, OF CHICAGO, ILLINOIS, ASSIGNOR TO FRANK B. ULLERY, OF CHICAGO, ILLINOIS.

ANIMAL-TRAP.

No. 902,005.            Specification of Letters Patent.          Patented Oct. 27, 1908.

Application filed February 19, 1906. Serial No. 301,901.

*To all whom it may concern:*

Be it known that I, JOHN SHEPHERD, a citizen of the United States, and resident of Chicago, in the county of Cook and State of Illinois, (whose post-office address is No. 23 Bryan Place,) have invented a certain new and useful Improvement in Animal-Traps.

The aim of my invention is to provide a trap having a plurality of pivotally held pins so arranged that the pins may be readily carried in one instance forward to permit the ready entrance of an animal into the trap, and in the other instance the pins are pivotally held to be carried outward to close the trap should the animal attempt to escape out of the trap or withdraw, after having partly entered, the pins being disposed in two horizontal series, upon which the animal is impaled in attempting to escape from or withdraw from the trap, and my trap comprises certain combinations as will be described more fully hereinafter.

In the accompanying drawings I have shown in Figure 1 a broken front view of a trap embodying my invention. Fig. 2, shows a broken sectional view of the front portion of a trap constructed according to my invention, while Fig. 3 discloses a top view of one of the tines, or pins.

I construct a trap housing A square and of any suitable size made of wire or any other suitable material such as is used in trap construction and this housing at any suitable point is provided with a door through which the entrapped animal may be allowed to pass out. I attach no importance to the shape or size of the trap housing.

To the forward end of the trap housing A, I secure a casing $b$ surrounding the upper and lower edges and the two side portions of the trap housing as is disclosed. This casing being preferably of sheet metal and having a portion re-curved as is shown at $b$ in Fig. 2, so that this casing may be securely clamped upon and secured to the trap housing A. This casing is provided near the lower end with a bar 1. This bar extends clear across the lower portion of the trap and forms a support for the lower row of tines 2. These tines are provided with a coil as is shown at 3 in Fig. 1 so as to provide a sleeve by means of which these tines are loosely held upon the lower tines supporting bar 1. Each tine terminates in a re-curved portion as is shown at 4, in Fig. 3. This re-curved portion 4 of the tine serves as a heel upon which the weight of the tine normally rests.

Positioned practically in horizontal alinement with the tine supporting bar 1, is a stop bar 5 as shown in Fig. 2, against which the heels of the tines strike whenever pressure is brought against the tines to carry the same forward to partly close the entry opening of the trap.

Above the tine supporting bar 1, is positioned a second tine supporting bar 6, the bars 1 and 6 both being provided with enlarged heads, as shown in Fig. 1 to facilitate securing the bars. The upper tine supporting bar 6, however, is held within a slot $v$ of the casing $b$ as is shown in Fig. 2, so that this tine holding bar 6 may be shifted and is so movably held, the enlarged ends of this upper tine holding bar preventing its displacement. Secured to this movable tine holding bar 6, at each end is an arm $b'$ which coils about this bar and is movable thereon and to these arms $b'$ is secured a guard plate C, which guard plate is held pendent but at an angle slightly out of the perpendicular, this guard plate resting upon the two projecting end tines $2'$ there being one at each end of the lower tine holding bar 1. The guard plate C is shown as resting upon one of the end tines in Fig. 2. This guard plate C is merely a strip of sheet metal, as will be understood in referring to Figs. 1 and 2. In Fig. 1 the projecting end tine positioned at one end is shown, while in Fig. 2 the projecting end tine $2'$ upon the opposite end of the bar 1 is shown. It will be noticed that all of the remaining tines 2 are somewhat shorter than the end tines $2'$ so that a considerable space is allowed between the guard plate C and the ends of the lower tines 2 as is disclosed in Fig. 2 and it is through this opening that the animal enters the trap. This guard plate C is quite light and is readily displaced in being carried upward whenever an animal enters the trap.

The movable tine holding bar 6 is provided with a plurality of tines 7 each being provided with a coil 8 and a projecting heel stem 9, these upper tines being constructed exactly like the lower tines but being differently disposed in that the upper tines are held pendent but loosely upon the movable tine holding bar 6, the heels 9 of these upper tines resting upon a suitable stop bar 10, as is shown in Fig. 2. These stop bars 5 and 10 are securely fastened and assist in imparting rigidity to the forward portion of the trap and so assist in strengthening and retaining the shape of the casing B. These tines 7 are a little short of the upper edge of the guard plate C, as disclosed in Fig. 1 so that these tines are permitted a movement free of the guard plate C.

Secured near the upper end of the trap and approximately above the movable tine holding bar 6 is a third stop bar 11 against which the heel stems 9 work in one direction whenever the lower ends of the tine 7 are carried inward to increase the entry opening.

From this description it will be noticed that should pressure be brought against the tine 2 as shown in Fig. 2 this tine will be swung upward until the heel stem 4 is stopped by the bar 5.

The tines 7 can be carried inward until the heel stem 9 strikes the bar 11. The casing B and the trap opening is of such a size that the same will accommodate one class of animals for which the trap is specially designed as for rats for instance. All small rats and rats of a medium size will find sufficient room to enter the trap through the opening between the tines 2 and 7. Should a rat of large size or an animal somewhat larger than a rat attempt to enter the trap, the animal may do so in that in pressing against the inwardly extending tines 7, the entire upper series of tines 7 may be raised as the movable tine holding bar 6, may be carried upward the length of the slot $v$, so that the width of the opening may be considerably increased and as the guard plate C is carried upward with this bar 6 the animal can readily enter the trap, the bar 6 dropping down into its normal position as soon as the animal has entered the trap. Now if the animal is in the trap the exit opening is closed to the same by means of the guard plate C, but even if this should be raised by the animal attempting to escape, it would simply be impaled upon the tines 2 and 7 which would close in towards one another when engaged, and so arrest the escape of the animal which in being thus injured by the tines would promptly draw back into the trap again.

The tines are preferably made of suitable wire and of course are properly pointed as is shown in Fig. 3.

Secured to the stop bar 11 is a metal plate 12 which closes the upper forward end of the trap.

Having thus described my said invention what I claim as new and desire to secure by U. S. Letters Patent is.

The combination in an animal trap of a casing at one end thereof, a lower tine supporting bar held transversely within said casing, a plurality of tines loosely held upon said bar each tine being provided with a heel stem, a stop bar, positioned above said heel stems, aforesaid casing being provided with two registering slots, a movable tine holding bar within said slots said tine holding bar being disposed above said first mentioned tine holding bar, a plurality of tines held upon said movable bar each tine being provided with a heel stem, of a second stop bar, said second stop bar being adapted to receive the heel stems of said second mentioned tines, a third stop bar disposed adjacent said last mentioned tines to be engaged by said last mentioned heel stems, and a guard plate pendent from said movable tine bar, all arranged substantially as set forth.

JOHN SHEPHERD.

Witnesses:
 GORDON B. CHASE,
 F. B. ULLEVEY.